Feb. 8, 1927.  1,617,015
A. DE VIVO
RAZOR HONE
Filed Dec. 30, 1924
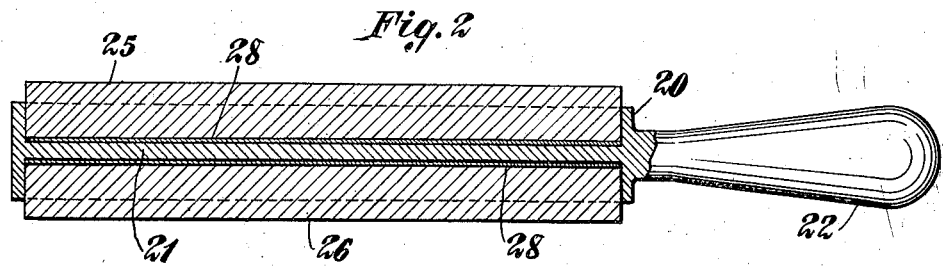
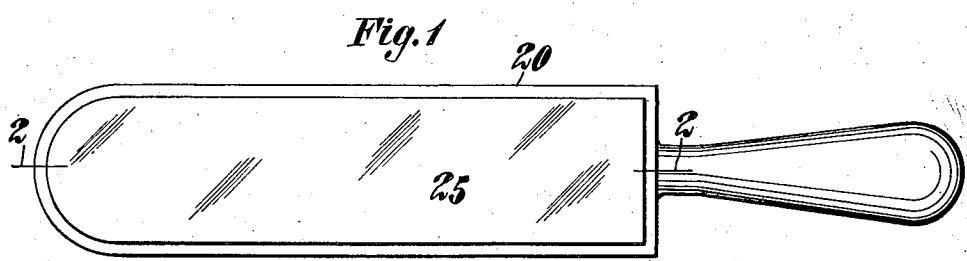
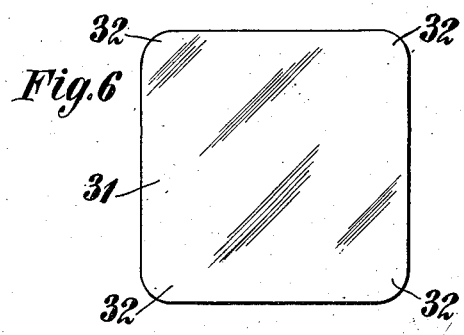
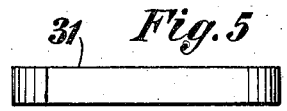
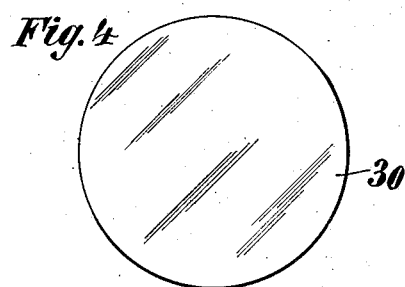
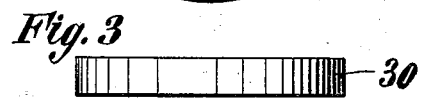
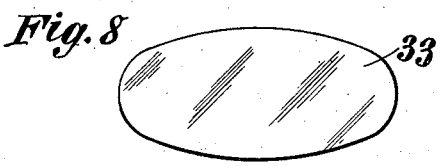
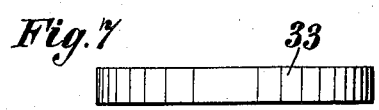
INVENTOR
Aniello DeVivo.
BY
ATTORNEY Patented Feb. 8, 1927.

1,617,015

UNITED STATES PATENT OFFICE.

ANIELLO DE VIVO, OF BAYONNE, NEW JERSEY.

RAZOR HONE.

Application filed December 30, 1924. Serial No. 758,847.

This invention relates to a razor hone, and is particularly directed to the composition of matter thereof and its method of production.

The object of the invention is the production of a hone comprising ingredients by means of which a razor, knife and the like can be easily either sharpened or honed.

In the accompanying drawings Fig. 1 represents the plan view of an exemplification of the improved razor hone with a suitable frame; Fig. 2 shows partial elevation and section of Fig. 1 on the line 2, 2; Fig. 3 shows an elevation of a modified form of hone; Fig. 4 is a top plan view of Fig. 3; Fig. 5 indicates an elevation of a third form of the hone; Fig. 6 is a top plan view of Fig. 5; Fig. 7 represents an elevation of a fourth form of the hone and Fig. 8 shows a top plan view of Fig. 7.

The ingredients of the hone comprises about in parts by volume, the following: sulphur, 80; red oxide of iron, 10; silicon, 8; pumice stone, 2.

The ingredients are brought to a powdered or granulated form, thoroughly mixed and then heated until the sulphur fuses to act as a binder to carry the other elements in suspension. The mass is then poured into a suitable mould to obtain the required form of the finished hone and allowed to cool. After the composition is cooled it may be secured to a suitable frame. It is admissible to pour the mixture into the mould to about fill one half thereof. This is allowed to nearly cool, when the other half of the mould is filled and allowed to cool. After the composition of matter has cooled, the surface or surfaces thereof are made smooth for use.

In Figs. 1 and 2, the frame is indicated with the flanges 20, which extend from the opposite sides of the central plate or body portion 21. A handle 22 is provided for one end of the frame.

A pair of hones are indicated at 25 and 26 which are fastened to the central plate 21 by an adhesive 28 like glue, cement and the like.

In Figs. 3 and 4 the hone is indicated in the form of a cylindrical disc 30 without being mounted in any frame.

In Figs. 5 and 6 the hone is shown as a flat approximately rectangular portion 31 with the rounded corners 32.

In Figs. 7 and 8 the hone is shown at 33 as flat and elliptical in contour. It is to be understood that the hone may be used with or without a frame, and it may be produced in various other forms not indicated in the drawings.

Various modifications may be made in the ingredients that constitute the hone and the exemplification is to be taken as illustrative and not limitative thereof.

Having described my invention what I desire to secure by Letters Patent and claim is:

1. A hone for sharpening razors and the like comprising the following ingredients in about the following proportions by volume, sulphur 80, red oxide of iron 10, silicon 8 and pumice stone 2.

2. The method of making a hone consisting in making a granulated or powdered mixture of sulphur, red oxide of iron, silicon and pumice stone, heating the mixture to fuse the sulphur and thereby carry the other elements in suspension, and then allowing the mixture to cool in approximate form.

Signed at the borough of Manhattan city of New York, in the county of New York and State of New York this 27th day of December A. D. 1924.

ANIELLO DE VIVO.